May 8, 1934.   C. A. BRANDT   1,957,524

METHOD OF MAKING RETURN BENDS

Filed April 18, 1931

Fig. 1

Fig. 2

Carl A. Brandt
INVENTOR

BY
ATTORNEY

Patented May 8, 1934

1,957,524

UNITED STATES PATENT OFFICE 1,957,524

METHOD OF MAKING RETURN BENDS

Carl A. Brandt, Great Neck, N. Y., assignor to
The Superheater Company, New York, N. Y.

Application April 18, 1931, Serial No. 531,151

3 Claims. (Cl. 29—157.6)

The present invention relates to the manufacture of return bends for pipes and particularly to the manufacture of such structures wherein the return bend is fabricated directly on the ends of the pipes to be joined and out of the material of the pipes themselves.

This general method of manufacturing return bends is well known and may be carried out in a number of different ways. One such method and one on which the present invention may be regarded as an improvement is described and illustrated in U. S. patent to Esch, #984,652. At the same time the present invention makes use of some steps of a process for the same purpose disclosed in U. S. Patent #1,169,209 to True and McKee.

In the Esch process the ends of the pipes to be joined by a return bend are split open for a certain distance and the portions along each side of the slit are bent out so that they lie parallel, and the edges of these portions are subsequently welded together, the outer ends of the pipes having been suitably bent so that the two pieces when placed into juxta-position form a return bend. In order to make a good weld of one edge to the other the half-bends must, as the patentee says in his description, be squared off, the purpose being to get the edges of the two pieces to make proper contact at all points. If the edges were left rough they would not be in good condition for welding.

One of the leading purposes of the present invention is to form edges of such pieces in such a way that they make very close contact with each other so that they can be readily welded. For this purpose a step is used in the present process which is closely analogous to one of the steps in the True and McKee patent referred to above.

My improvement has particular application to pipes made of material such as certain heat resisting steels which do not readily weld by pressure or impact, although I do not wish to restrict myself in this respect.

Figure 3:
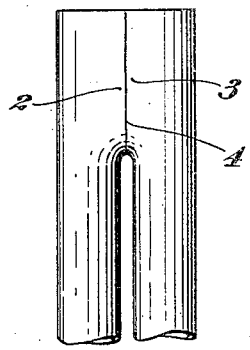
Figure 4:
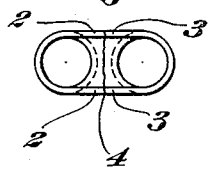
Figure 5:
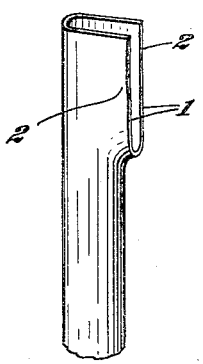
Figure 6:
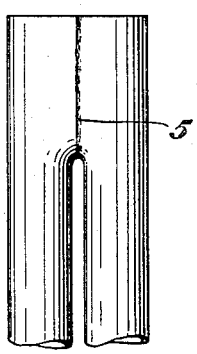
Figure 7:
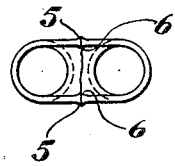
Figure 8:
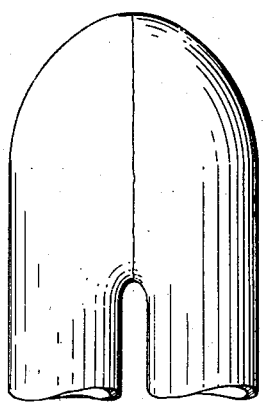

In connection with the discussion of my invention I refer to the figures in the accompanying drawing. In these, Fig. 1 represents the ends of two pipes which are to be joined by my process; Fig. 2 is an end view of these pipes; Fig. 3 shows the two pipe ends in elevation after one step of the operation; Fig. 4 showing an end view of Fig. 3; Fig. 5 shows an isometric view of one of the two pipes after the first step has been completed; Fig. 6 shows the two pipes after the subsequent operation by welding; Fig. 7 shows an end view of Fig. 6, and Fig. 8 shows the completed return bend.

If a pair of pipe ends like the one shown in Fig. 5 are prepared by splitting each pipe for a suitable distance inward from its end and spreading the adjacent portions upward, then as stated above, the edges 1—1 must be suitably machined so that the edges of the one piece will accurately engage those of the other piece if a proper weld is to be made. For this purpose these edges have in the past been machined, planed or ground so that all portions of the edges lie in a common plane. The main purpose of the present invention is to obviate the necessity of such machining.

For this purpose I treat the two pipe ends which I am to join, in exactly the same way as they are treated in the process described in the True and McKee patent. This process is now well known in the art and need not be described in any great detail. Suffice it to say that the two pipes are suitably heated, placed in a die in the relative position which they are to occupy in the completed return bend, and a second die or plunger whose two prongs enter the two pipes, splits the juxtaposed walls and turns the flaps adjacent to the split outward so that they come into forcible contact with each other. Two such pipes are shown in Figs. 1 and 2, and in Figs. 3 and 4 the structure resulting from the stroke of the plunger is illustrated. The portions 2—2 of one pipe have been bent outward so that they come into forcible contact with the similarly treated portions 3—3 of the second pipe. When the material of the pipes is such that it is readily welded by pressure or hammering this step will result in uniting the pipes in a firm weld along the line indicated at 4, Fig. 3. With material, however, such as referred to above, which cannot be welded, no union will occur. On account of the forcible way in which the two edges have been brought into contact with each other, however, the one will be an exact complement of the other. In carrying out this step in my process, the two pipes are, as will be understood, heated and this heating will facilitate the splitting and the formation of the complementary surfaces. After the plunger has performed its stroke and the two pipes have been shaped, as described, they are removed from the die. They may adhere to a certain extent but a slight blow with a hammer will at once separate them. One of the pipes is shown in projection in Fig. 5. The edge 1—1 is not by any means a flat surface, and in fact, may be quite irregular. The other pipe has corresponding portions fitting into the irregularities of 1—1 so that when they are placed together they are in very intimate contact. It is this method of forming these faces to engage each other closely that I regard as the principal part of my invention.

The two ends shaped as described are next placed in contact or left in contact when first removed from the die and are then welded together by an electrical flash or resistance method. This results in a good weld along the line 1 on account of the intimate contact of the two parts. A slight burr will probably form at 5—5 on the outside and 6—6 on the inside. This is, if desired, removed by any desired means. It should be noted that the interior of the unfinished pipe end is accessible at this stage for this purpose from the end. A convenient way of accomplishing the removal of the burrs is to put the structure into a suitably shaped die and insert a two-pronged male die which fits into the interior of the piece, or incomplete return bend, and to flatten down the burrs, especially the interior one, by repeated hammering or tapping blows of the male die. After the steps described, the incomplete return bend is treated exactly as the corresponding structures in the process as practiced heretofore. The open end is rounded and drawn down to a closed end and if desired, the return bend is shaped up to a finished form, as illustrated in Fig. 8. This part of the process I do not claim as part of my invention as I do not modify the known method and manipulation.

In some cases a pipe made of ordinary steel is to be joined by a return bend to one made of heat-resisting steel which cannot be welded to the former by pressure or impact, and the above described method can be advantageously used in such cases. Similarly pipes made of other materials than heat-resistant steels, e. g., copper, bronze, and brass can be joined by my improved process.

I claim:

1. In the art of making return bends to connect pipes in pairs, the return bends being made directly on the pipes out of portions of the pipes adjacent to their ends, the steps of taking two pipes of material not readily weldable by pressing or hammering, heating their ends, splitting each of them for a suitable distance inward from its end along a line parallel to its axis, bending the portions of each adjacent to the slit outward, causing the edges of the bent-out portions of one to abut forcibly against the corresponding edges of the bent-out portions of the other, whereby these edges will assume closely complementary forms without being welded to each other, and subsequently welding the edges together.

2. The process according to claim 1, the bending of the portions outward and causing them to abut being simultaneous.

3. The process according to claim 1, the bending of the portions outward and causing them to abut being simultaneous and the welding of the edges being done electrically.

CARL A. BRANDT.